(12) United States Patent
He et al.

(10) Patent No.: US 10,198,471 B2
(45) Date of Patent: Feb. 5, 2019

(54) JOINING SEMANTICALLY-RELATED DATA USING BIG TABLE CORPORA

(71) Applicant: MICROSOFT TECHNOLOGY LICENSING, LLC, Redmond, WA (US)

(72) Inventors: Yeye He, Redmond, WA (US); Kris Kuppuswamy Ganjam, Seattle, WA (US); Xu Chu, Kitchener (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 856 days.

(21) Appl. No.: 14/726,547

(22) Filed: May 31, 2015

(65) Prior Publication Data

US 2016/0350369 A1    Dec. 1, 2016

(51) Int. Cl.
*G06F 17/30* (2006.01)

(52) U.S. Cl.
CPC .. *G06F 17/30454* (2013.01); *G06F 17/30498* (2013.01); *G06F 17/30536* (2013.01); *G06F 17/30864* (2013.01)

(58) Field of Classification Search
CPC .......... G06F 17/30; G06F 17/28; G06Q 10/10
See application file for complete search history.

(56) References Cited

U.S. PATENT DOCUMENTS

| | | | |
|---|---|---|---|
| 5,943,665 A | 8/1999 | Guha | |
| 6,553,371 B2 | 4/2003 | Gutierrez-Rivas et al. | |
| 6,721,754 B1 | 4/2004 | Hurst et al. | |
| 6,996,567 B2 | 2/2006 | Ghukasyan | |
| 7,969,980 B1* | 6/2011 | Florit | H04L 12/185 370/390 |
| 8,438,153 B2 | 5/2013 | Krishna et al. | |
| 2008/0183661 A1 | 7/2008 | Orlowska et al. | |
| 2011/0320433 A1 | 12/2011 | Mohiuddin et al. | |
| 2013/0091120 A1 | 4/2013 | Ganjam et al. | |
| 2013/0238621 A1* | 9/2013 | Ganjam | G06F 17/30864 707/737 |
| 2013/0346464 A1 | 12/2013 | Cheng et al. | |
| 2014/0280024 A1 | 9/2014 | Baskett et al. | |
| 2015/0006542 A1 | 1/2015 | Gorelik | |
| 2015/0019540 A1 | 1/2015 | Ganjam et al. | |

OTHER PUBLICATIONS

Surjit Chaudhuri, A Primitive Operator for Similarity Joins in Data Cleaning , pp. 1-12; Apr. 3; (Year: 2006).*

(Continued)

*Primary Examiner* — Scott A. Waldron
*Assistant Examiner* — Fatima P Mina

(57) ABSTRACT

Examples of the disclosure enable performing semantic joins using a big table corpus. Pairs of values from at least two data sets are identified. The pairs of values include one value from a first one of the data sets and one value from a second one of the data sets. Statistical co-occurrence scores for the identified pairs of values are determined based on historical co-occurrence data. The determined statistical co-occurrence scores are used for predicting a semantic relationship between the at least two data sets. The predicted semantic relationship is used for joining the at least two data sets.

20 Claims, 8 Drawing Sheets

(56) References Cited

OTHER PUBLICATIONS

"International Search Report and Written Opinion Issued in PCT Application No. PCT/US2016/032941", dated Jul. 22, 2016, 13 Pages.
Mulwad, Varish, "DC Proposal: Graphical Models and Probabilistic Reasoning for Generating linked Data from Tables", In Proceedings of 10th International Semantic Web Conference, Oct. 23, 2011, 8 Pages.
Mulwad, et al., "A Domain Independent Framework for Extracting Linked Semantic Data from Tables", In Book-Search Computing : Broadening Web Search, Jan. 1, 2012, 20 Pages.
Kedad, et al., "Dealing with Semantic Heterogeneity During Data Integration", In Proceedings of 18th International Conference on Conceptual Modeling, Nov. 15, 1999, 14 Pages.
"International Preliminary Report on Patentability Issued in PCT Application No. PCT/US2016/032941", dated Jul. 13, 2017, 9 Pages.
Cafarella, et al., "WebTables: Exploring the Power of Tables on the Web", In Journal of the VLDB Endowment, vol. 1 Issue 1, Aug. 2008, 12 Pages.
Lehmberg, et al., "Extending Tables with Data from over a Million Websites", In Proceedings of International Semantic Web Conference, Oct. 22, 2014, 8 Pages.
Bhagavatula, et al., "Methods for Exploring and Mining Tables on Wikipedia", In Proceedings of the SIGKDD Workshop on Interactive Data Exploration and Analytics, Aug. 11, 2013, 9 Pages.
An, et al., "Inferring Complex Semantic Mappings Between Relational Tables and Ontologies from Simple Correspondences", In Proceedings of OTM Confederated International Conferences , Oct. 31, 2005, pp. 1152-1169.
Natsev, et al., "Supporting Incremental Join Queries on Ranked Inputs", In Proceedings of the 27th International Conference on Very Large Data Bases, Sep. 11, 2001, 10 Pages.
"List of FIPS Country Codes", Retrieved on: Mar. 12, 2015, 17 pages. Available at: http://en.wikipedia.org/wiki/List_of_FIPS_country_codes.
"ISO 3166-1", Retrieved on: Mar. 12, 2015, 16 pages. Available at: http://en.wikipedia.org/wiki/ISO_3166-1.
"Microsoft Power BI", Retrieved on: Mar. 12, 2015, 2 pages. http://www.microsoft.com/en-us/powerbi/default.aspx.
"Microsoft Solver Foundation 3.1'", Retrieved Date: Mar. 12, 2015, 2 pages. Available at: https://msdn.microsoft.com/en-us/library/ff524509%28v=vs.93%29.aspx.
Bizer, Christian, "Search Joins with the Web", In Proceedings of 17th International Conference on Database Theory, Mar. 24, 2014, p. 3.
Bollacker, et al., "Freebase: A Collaboratively created Graph Database for Structuring Human Knowledge", In Proceedings of SIGMOD International Conference on Management of Data, Jun. 9, 2008, pp. 1247-1249.

Cafarella, et al., "Data Integration for the Relational Web", In Proceedings of the VLDB Endowment, vol. 2, Issue 1, Aug. 24, 2009, pp. 1090-1101.
Chaudhuri, et al., "A Primitive Operator for Similarity Joins in Data Cleaning", In Proceedings of 22nd International Conference on Data Engineering, Apr. 3, 2006, pp. 1-12.
Chen, et al., "Improving Hash Join Performance through Prefetching", In Journal of Transactions on Database Systems, vol. 32, Issue 3, Aug. 1, 2007, pp. 1-36.
Chuklin, et al., "Modeling Clicks beyond the First Result Page", In Proceedings of 22nd International Conference on Conference on Information & Knowledge Management, Oct. 27, 2013, pp. 1217-1220.
Church, et al., "Word Association Norms, Mutual Information, and Lexicography", In Journal of Computational Linguistics, vol. 16, Issue 1, Mar. 1990, pp. 22-29.
Cohen, William W., "Data Integration using Similarity Joins and a Word-Based Information Representation Language", In Journal of Transactions on Information Systems, vol. 18, Issue 3, Jul. 2000, pp. 288-321.
Dewitt, et al., "The Gamma Database Machine Project", In Journal of Transactions on Knowledge and Data Engineering, vol. 2, Issue 1, Mar. 1990, 38 Pages.
Dewitt, et al., "Implementation Techniques for Main Memory Database Systems", In Proceedings of the SIGMOD International Conference on Management of Data, Jun. 18, 1984, 8 Pages.
Feige, et al., "On the densest k-Subgraph Problem", In Algorithmica, Sep. 8, 1997, 18 Pages.
Pardalos, et al., "Quadratic Programming with One Negative Eigenvalue is Np-Hard", In Journal of Global Optimization, vol. 1, Issue 1, Mar. 1, 1991, 4 Pages.
Sarma, et al., "Finding Related Tables", In Proceedings of the SIGMOD International Conference on Management of Data, May 20, 2012, pp. 817-828.
Selinger, et al., "Access Path Selection in a Relational Database Management System", In Proceedings of the SIGMOD International Conference on Management of Data, May 30, 1979, pp. 23-34.
Simpson, Thomas W., "Evaluating Google as an Epistemic Tool", In Proceedings of Metaphilosophy, vol. 43, Issue 4, Jul. 16, 2012, 21 Pages.
Vaziran, Vijay V., "Approximation Algorithms", In Proceedings of Springer, Mar. 22, 2004, 5 Pages.
Xiao, et al., " Efficient Similarity Joins for near Duplicate Detection", In Proceedings of the 17th International Conference on World Wide Web, Apr. 21, 2008, pp. 131-140.
Yakout, et al., "InfoGather: Entity Augmentation and Attribute Discovery by Holistic Matching with Web Tables", In Proceedings of the SIGMOD International Conference on Management of Data, May 20, 2012, pp. 97-108.
"Second Written Opinion Issued in PCT Application No. PCT/US2016/032941," dated Apr. 4, 2017, 8 Pages.

\* cited by examiner

JOINING SEMANTICALLY-RELATED DATA USING BIG TABLE CORPORA

BACKGROUND

Traditional join processing relies on string equality comparisons of values (e.g., joining of two tables). While equi-joins work well in heavily curated relational database or data warehousing settings where data are extensively cleansed and transformed into suitable formats, typically a user has to manually find an intermediate mapping table to perform the desired join. Further, in most scenarios, there may not be a single intermediate mapping table that can cover all desired join pairs. In examples in which at least two data sets are to be joined, if the values in the data sets are related but in different representations, then the join processing cannot be performed without manually finding an intermediate mapping table or manually joining the values in the data sets. The existing systems for performing join processing are inconvenient, time-consuming, and even infeasible to use under some circumstances.

SUMMARY

Examples of the disclosure enable performing semantic joins using one or more big table corpora. Pairs of values from at least two data sets are identified. The pairs of values include one value from a first one of the data sets and one value from a second one of the data sets. Statistical co-occurrence scores for the identified pairs of values are determined based on historical co-occurrence data. The determined statistical co-occurrence scores are used for predicting, by a processor associated with a computing device, a semantic relationship between the at least two data sets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
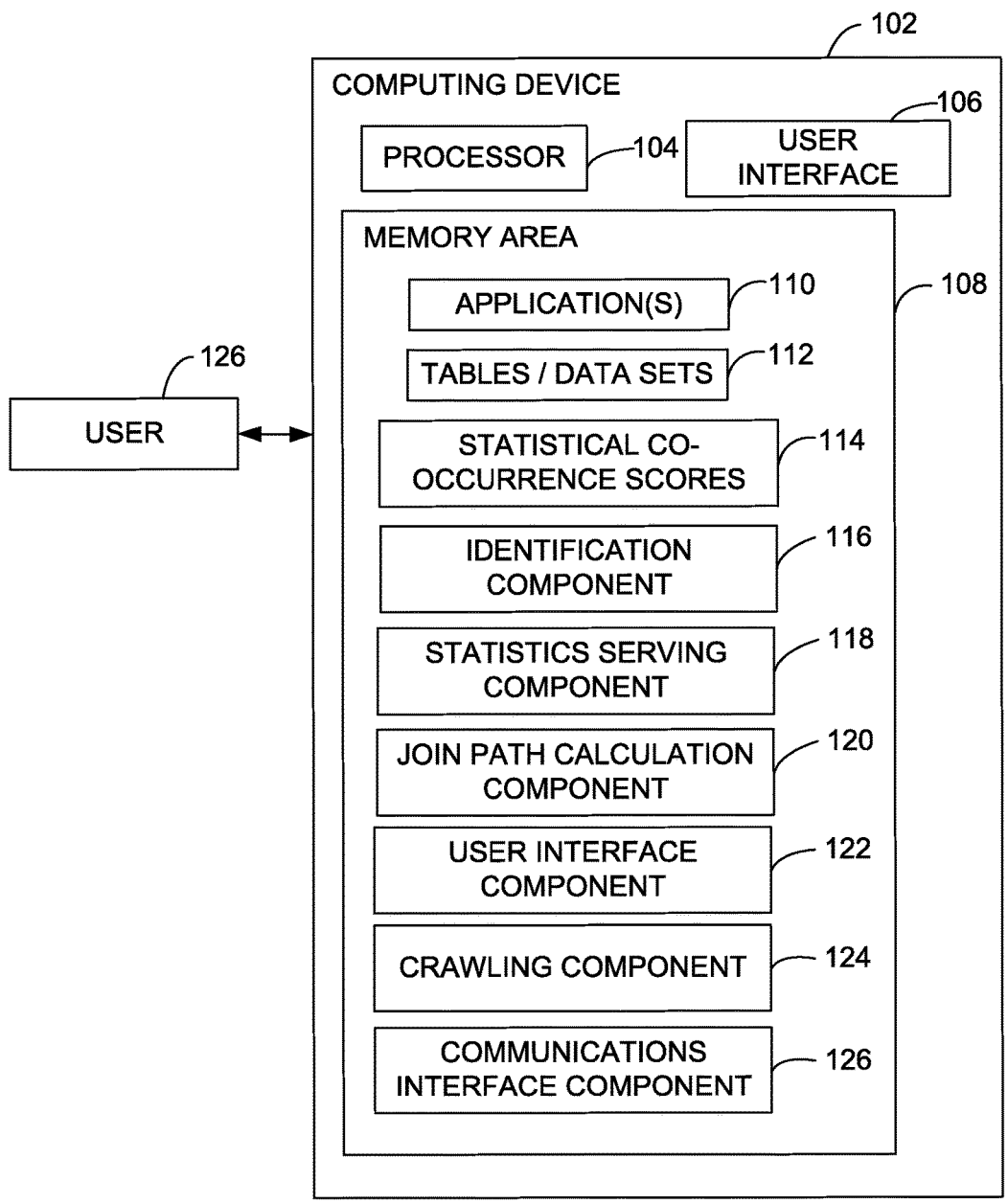
FIG. 1 is an exemplary block diagram illustrating a computing device for performing semantic join operations on data.

Referring to the figures, examples of the disclosure enable performing semantic join operations (e.g., "sema-join") on data in different representations. The data is stored in a plurality of tables having rows and columns of values. For example, in a spreadsheet environment, a user 126 may want to join one table with a subject column country-code, with another table with a subject column country-name. Traditional systems (e.g., performing equi-join) cannot handle such joins automatically, and the user 126 typically has to manually find an intermediate mapping table in order to perform the desired join. Aspects of the disclosure provide an automated system that predicts and/or infers a join relationship to facilitate semantic joins on the data in different representations (e.g., same set of columns in two tables using different representations or a related set of columns in two tables using different representations). The join relationship is predicted or inferred using statistical co-occurrence scores which are determined based on historical co-occurrence data.

Consider an example in which a business analyst inside a large Internet company has a table with ads revenue of a company across different countries, as shown in Table 1(a) below with hypothetical data:

TABLE 1(a)

Hypothetical Company Sales Data by Country Code.

| COUNTRY CODE | USERS | SALES |
|---|---|---|
| US | 235,455 | 9,124 |
| CN | 432,000 | 3,992 |
| JP | 111,000 | 2,531 |
| IN | 206,674 | 1,720 |
| BR | 89,000 | 1,701 |
| GB | 71,053 | 1,513 |
| DE | 136,000 | 1,470 |
| RU | 14,104 | 1,335 |
| MX | 105,766 | 947 |

The first column of the Table 1(a) lists all countries using the 2-digit ISO country code. The second column of the Table 1(a) lists number of Internet users in each country and the third column lists ad revenue (e.g., sales) in each country for the company.

The business analyst also has another table with hypothetical data. Table 1(b) shown below lists a hypothetical total number of Internet users and hypothetical Internet penetration rate in each country:

TABLE 1(b)

Hypothetical Internet Penetration by Country Name.

| COUNTRY NAME | INTERNET USERS | PENETRATION |
|---|---|---|
| China | 568,192,066 | 42.30% |
| United States | 254,295,536 | 81.00% |
| India | 243,298,994 | 19.60% |
| Japan | 100,684,474 | 79.10% |
| Brazil | 99,357,737 | 49.80% |
| Russia | 75,926,004 | 53.30% |
| Germany | 68,296,919 | 84.00% |
| Nigeria | 55,000,000 | 32.90% |
| United Kingdom | 54,861,245 | 87.00% |

If the business analyst is to join the two Tables 1(a) and 1(b) (or any other plurality of tables like these), traditional equi-join operations using string equality comparison will fail or the business analyst will have to manually find an intermediate mapping table having mapping of country names and the 2-digit ISO country codes. In contrast, aspects of the disclosure enable joining Table 1(a) and Table 1(b) using an automated system that predicts the desired join relationship to facilitate the semantic join. Pairs of values from the two tables are identified. Each pair includes one value from the first column of Table 1(a) and another value from the first column of Table 1(b). Statistical co-occurrence scores are determined for the identified pairs of values based on historical co-occurrence data (e.g., comprising a big table corpus, a plurality of big table corpora, enterprise database, earlier co-occurrence data, and the like). A join relationship between the two tables is inferred or predicted using the statistical co-occurrence scores.

Aspects of the disclosure further enable a semantic join of at least two data sets (e.g., tables, comma-separated values (CSV) etc.). The semantic join is performed automatically without any user interaction or very minimal user interaction. Thus, aspects of the disclosure enable faster and accurate semantic join. Aspects of the disclosure enable a semantic join when the two data sets are referring to the same concept but use different representations (e.g., Table 1(a) uses 2-digit ISO country codes whereas Table 1(b) uses country names referring to the same concept of countries). Aspects of the disclosure also enable joining two data sets which do not necessarily refer to the same entity. For example, if one data set includes states and their population and the other data set includes cities and their crime rates, then also semantic joining of these two data sets is enabled by the aspects of the disclosure. As such, the processing speed of performing the join operation is increased with reduced error rate thereby enhancing user experience. Further, aspects of the disclosure improve the precision of automated join operation.

Referring to FIG. 1, an exemplary block diagram illustrates a computing device 102 for performing semantic join operations on data. In the example of FIG. 1, the computing device associated with the user 126 represents a system for performing semantic join operations on data in different representations. The computing device 102 represents any device executing instructions (e.g., as application programs, operating system functionality, or both) to implement the operations and functionality associated with the computing device 102. The computing device 102 may include a mobile computing device or any other portable device. In some examples, the mobile computing device includes a mobile telephone, laptop, tablet, computing pad, netbook, gaming device, and/or portable media player. The computing device 102 may also include less portable devices such as desktop personal computers, kiosks, tabletop devices, industrial control devices, wireless charging stations, and electric automobile charging stations. Additionally, the computing device 102 may represent a group of processing units or other computing devices.

In some examples, the computing device 102 has at least one processor 104, a memory area 108, and at least one user interface 106 (e.g., for entering the command to join two tables and/or for displaying the joined table). The processor 104 includes any quantity of processing units, and is programmed to execute computer-executable instructions for implementing aspects of the disclosure. The instructions may be performed by the processor 104 or by multiple processors 104 executing within the computing device 102, or performed by a processor external to the computing device 102. In some examples, the processor 104 is programmed to execute instructions such as those illustrated in the figures (e.g., FIGS. 4-8).

In some examples, the processor 104 represents an implementation of analog techniques to perform the operations described herein. For example, the operations may be performed by an analog computing device and/or a digital computing device.

The computing device 102 further has one or more computer readable media such as the memory area 108. The memory area 108 includes any quantity of media associated with or accessible by the computing device 102. The memory area 108 may be internal to the computing device 102, external to the computing device 102, or both. In some examples, the memory area 108 includes read-only memory and/or memory wired into an analog computing device 102.

The memory area 108 stores, among other data, one or more applications 110. The applications 110, when executed by the processor 104, operate to perform functionality on the computing device 102. Exemplary applications 110 include mail application programs, web browsers, calendar application programs, address book application programs, messaging programs, media applications, location-based services, search programs, word processing applications, spreadsheet applications, and the like. The applications 110 may communicate with counterpart applications or services such as web services accessible via a network 202. For example, the applications 110 may represent downloaded client-side applications that correspond to server-side services executing in a cloud.

The memory area 108 further stores data sets and/or tables 112 from which at least two data sets and/or tables are to be joined (e.g., the tables have columns of values and rows of values). In some examples, the memory area 108 also stores statistical co-occurrence scores 114 for pairs of values (e.g., which may have been determined earlier based on historical co-occurrence data). The processor 104 is programmed to receive a request to perform a semantic join operation on at least two of the tables stored in the memory area 108. The request may be an explicit request from the user 126 to perform the join operation on the at least two tables or an implicit request (e.g., the user 126 performs a search operation which receives input from two tables and the search operation returns correct results if the two tables are joined using aspects of the disclosure). In response to the received request, pairs of values from the at least two tables are identified. The pairs of values are identified by identifying a plurality of combinations of values from the first one of the tables and values from the second one of the tables.

The pairs of values include one value from a column in a first one of the tables and one value from a column in a second one of the tables. Statistical co-occurrence scores for the identified pairs of values are determined based on historical co-occurrence data (e.g., one or more of a big table corpus, enterprise database, and earlier co-occurrence data). The statistical co-occurrence scores for the identified pairs of values are based on one or more of a row-level statistical co-occurrence score and a column-level statistical co-occurrence score.

In some examples, the statistical co-occurrence scores for the identified pairs of values are determined by crawling a plurality of relational tables (which are a portion of the historical co-occurrence data). A correlation score is calculated for each of the identified pairs of values based on the plurality of relational tables which are crawled. The correlation scores for the identified pairs of values are aggregated to measure an aggregate correlation score for the identified pairs of values. The aggregate correlation score is a measure of semantic relation between the identified pairs of values, the measure of semantic relation being derived from the plurality of relational tables. The measured aggregate correlation score is used for generating a portion of the historical co-occurrence data (e.g., this portion of the historical co-occurrence data represents earlier co-occurrence data for subsequent joins). The generated portion of the historical co-occurrence data is used for calculating the statistical co-occurrence scores for the identified pairs of value.

In some other examples, a plurality of relational tables is crawled in an offline mode (e.g., the crawling of the relational table may be performed without, or otherwise not in response to, a user request for joining at least two tables). In such examples, crawling of the relational tables may be performed when the processor 104 is relatively free (e.g., the processor 104 has somewhat lesser load than a predefined threshold). Crawling of the relational tables generates the statistical co-occurrence scores for the pairs of values in the plurality of tables (these pairs of values correspond to values in the columns of values in the plurality of tables (which may be part of a big table corpus 204 and/or an enterprise database). The generated statistical co-occurrence scores are stored in the memory area 108 and may represent earlier co-occurrence data for subsequent joins. The presence of earlier co-occurrence data results in faster joins because at least some of the pairs of values may already have co-occurrence data from earlier joins and thus the subsequent joins may have to determine statistical co-occurrence score for only some of the pairs of values for which earlier co-occurrence data does not exist.

A join relationship between the at least two tables is inferred using the statistical co-occurrence scores. The join relationship is inferred by generating a maximum aggregate correlation score among all pairs of values, wherein the join relationship is automatically inferred (in some examples) if the maximum aggregate correlation score is above a threshold. For example, if more than one join relationship is inferred between the at least two tables, a join relationship having maximum aggregate correlation score is ranked higher than other join relationships (e.g., the join relationships are ranked from the highest aggregate correlation score to the lowest aggregate correlation score). The join relationship is automatically inferred if the maximum aggregate correlation score is above a threshold (e.g., point-wise mutual information (PMI) score threshold may be predefined as 0 for the pair of values) in some examples. Some of the pair of values, for which the PMI score is below 0, are ignored. For example, if United States and JP (Country Code for Japan) co-occurred very infrequently, then their PMI score will be less than 0 and the value pair (United States, JP) is pruned away as less meaningful. In some examples, the maximum aggregate correlation scores for each of the pair of values are used to calculate a final score which indicates how well the two tables join. The final score is usable as a feature in a table ranking system to rank joinable tables higher than the other tables which may not be joinable. In such examples, the table ranking system searches first in the higher ranked joinable tables for performing the subsequent join or performing a subsequent search. In this way, the subsequent join may be performed faster and more efficiently because the probability of finding co-occurring pair of values is higher in the higher ranked joinable tables.

Alternatively or in addition, the processor 104 may be programmed to output a bridge table based on the inferred join relationship. The bridge table is used to perform semantic join of the at least two tables. In some examples, the bridge table is presented to the user 126 of the computing device 102 who may make corrections to the identified pairs of values for which the inferred join relationship in the bridge table is incorrect. The bridge table is updated with the corrections to the identified pairs of values such that the join relationship in the bridge table is now correct.

The memory area 108 further stores one or more computer-executable components. Exemplary components include an identification component 116, a statistics serving component 118, a join path calculation component 120, a user interface component 122, a crawling component 124 and a communications interface component 126. The identification component 116, on execution by at least one processor 104, causes the at least one processor 104 to identify pairs of values from at least two data sets. The pairs of values include one value from a first one of the data sets and one value from a second one of the data sets. The statistics serving component 118, on execution by at least one processor 104, causes the at least one processor 104 to calculate statistical co-occurrence scores for one or more of the identified pairs of values based on their strength of correlation in a big table corpus. Calculating the statistical co-occurrence scores may mean determining the statistical co-occurrence scores for the one or more of the identified pairs of values from the big table corpus. In some examples, the statistical co-occurrence scores for all the pairs of values (e.g., as identified by the identification component 116) may be available in the big table corpus. In some other examples, the statistical co-occurrence scores may be available in the big table corpus for some of the pairs of values or the statistical co-occurrence scores may be unavailable in the big table corpus for any of the pairs of values. In such examples, the statistical co-occurrence scores is calculated for the pairs of values for which the statistical co-occurrence scores are unavailable.

In some examples, the crawling component 124, on execution by at least one processor 104, causes the at least one processor 104 to crawl the big table corpus for determining the strength of correlation for one or more of the identified pairs of values. Some parameters affecting the strength of correlation are the source of a relational table in the big table corpus (e.g., a relational table from an enterprise may be given more weight than another relational table from some open source database), earlier statistical co-occurrence scores which may be present in the big table corpus and their source (e.g., earlier statistical co-occurrence scores from the same user are given more weight than earlier statistical co-occurrence scores for another user), coverage of data (e.g., a relational table covering 90% of pairs of values is given more weight than another table covering only 2% of the pairs of values), and the like.

The join path calculation component 120 on execution by at least one processor 104 causes the at least one processor 104 to compute a join relationship between the one or more of the identified pairs of values using the statistical co-occurrence scores calculated by the statistics serving component 118. The statistical co-occurrence scores for the one or more of the identified pairs of values are based on one or more of a row-level statistical co-occurrence score and a column-level statistical co-occurrence score. The user interface component 122, on execution by at least one processor 104, causes the at least one processor 104 to present the computed join relationship to a user 126 for performing semantic join of the at least two data sets. If the computed join relationship is correct, the user 126 may directly opt for performing the semantic join of the at least two data sets based on the presented join relationship. Otherwise, the user 126 may opt for making corrections to the presented join relationship and thereafter the corrected join relationship is used for performing the semantic join of the at least two data sets.

The communications interface component 126 may provide the request to join the two tables from the computing device 102 to another computing device (e.g., a server on which the two tables to be joined may be hosted). In some examples, the communications interface component 126 includes a network interface card and/or computer-executable instructions (e.g., a driver) for operating the network interface card. Communication between the computing device 102 and other devices (having the big table corpus or the historical co-occurrence data) may occur using any protocol or mechanism over any wired or wireless connection (e.g., Wi-Fi, BLUETOOTH brand communications, or cellular connection). In some examples, the communications interface is operable with short range communication technologies such as by using near-field communication (NFC) tags.

In some examples, the user interface component 122 includes a graphics card for displaying data to the user 126 and receiving data from the user 126. The user interface component 122 may also include computer-executable instructions (e.g., a driver) for operating the graphics card. Further, the user interface component 122 may include a display (e.g., a touch screen display or natural user interface) and/or computer-executable instructions (e.g., a driver) for operating the display. The user interface component 122 may also include one or more of the following to provide data to the user 126 or receive data from the user 126: speakers, a sound card, a camera, a microphone, a vibration motor, one or more accelerometers, a BLUETOOTH brand communication module, global positioning system (GPS) hardware, and a photoreceptive light sensor. For example, the user 126 may input commands or manipulate data by moving the computing device 102 in a particular way.

Figure 2:
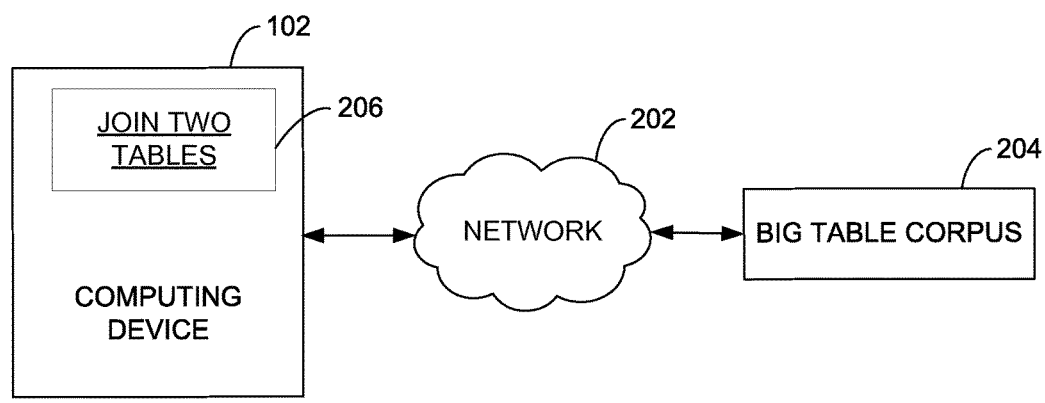
FIG. 2 is an exemplary block diagram illustrating a computing device using big table corpus over a network for performing semantic join operations on two tables.

Referring next to FIG. 2, an exemplary block diagram illustrates a computing device 102 that uses a big table corpus 204 over a network 202 for performing semantic join operations on two tables (join two tables 206 represents the command to join two or more tables/data sets). While the computing device 102 in FIG. 2 is shown as performing join of two tables, joining of more than two data sets (e.g., more than two tables) is within the scope of the present disclosure. The big table corpus 204 may be hosted on a server or on distributed sets of servers. In some examples, the big table corpus 204 includes relational tables (or data sets) on the cloud or associated with an enterprise database. The big table corpus 204 may also include historical co-occurrence data. While the big table corpus 204 is identified as including the historical co-occurrence data, in some examples, the historical co-occurrence data may include a big table corpus 204. For example, the big table corpus 204 may include over 100 million web tables and the enterprise database may comprise over 500,000 enterprise database tables. In some examples, the computing device 102 shown in FIG. 2 may merely issue a command for joining two tables and the tables to be joined and the big table corpus 204 (or the historical co-occurrence data) may be hosted on cloud storage (e.g., the cloud). In such examples, the output of the tables joining operation may be displayed on the computing device 102 or on a display associated with the computing device 102. The output table may be stored on the computing device 102 or on the cloud (e.g., on a server which hosted the two tables to be joined).

Figure 3:
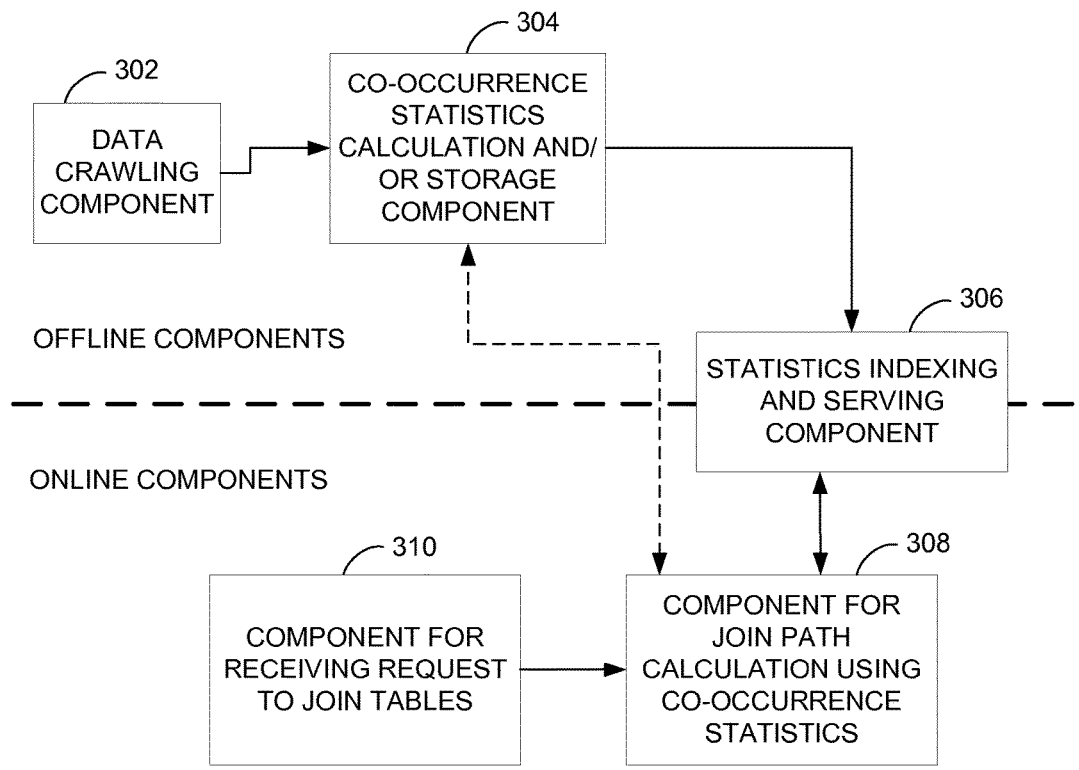
FIG. 3 is an exemplary block diagram illustrating operations for performing semantic join operations on data.

Referring next to FIG. 3, an exemplary block diagram illustrates operations for performing semantic join operations on data. For example, the data crawling component 302 crawls relational tables from sources including public web pages, as well as optionally from proprietary sources such as enterprise spreadsheets. The co-occurrence statistics calculation and/or storage component 304 shreds (e.g., divides or sub-divides) the crawled relational content into pairs of co-occurring values (e.g., "GB" in Table 1(a) and "United Kingdom" in Table 1(b)), which are then aggregated to obtain statistical co-occurrence scores such as point-wise mutual information to measure their strength of correlation (e.g., by utilizing a big-data computation platform).

The statistical co-occurrence scores are then indexed and stored by a statistics indexing and serving component 306. The statistics indexing and serving component 306 serves online queries as input tables to join come via a component 310 receiving a request to join tables. The component 310 may provide input tables to join based on an explicit request for joining the two tables (or more than two tables) in which the tables to be joined may be input/identified by the user 126. In some examples, the component 310 may provide input tables to join based on an implicit request from the user 126. For example, if the user 126 queries for ad revenue and Internet penetration in United Kingdom and this information is not available in a single table, then this query may be answered by joining two tables (e.g., Table 1(a) and Table 1(b) which may be a part of the big table corpus). In this example, the tables are not explicitly input by the user 126 and it is the processor 104 associated with the computing device 102 which determines that the two tables have to be joined (based on the statistical co-occurrence scores for "GB" and "United Kingdom" in the big table corpus) for answering the user's query.

The join path calculation using component 308 receives the two tables to be joined (or the user's query that may require the two tables to be joined). The join path calculation using component 308 queries the statistics indexing and serving component 306 to retrieve relevant co-occurrence statistics for pairs of cell values in the joining tables. These statistics are then used by an online linear-program-based optimization algorithm in the join path calculation using component 308 to compute the most likely join relationship (e.g., having maximum statistical co-occurrence score) given the input tables. In some examples, apart from the most likely join relationship, other join relationships are also presented to the user 126 (e.g., in an order of their respective statistical co-occurrence scores) from which the user 126 may select the appropriate/correct join relationship. In some examples, the user 126 may input a correct join relationship if none of the presented join relationships is correct. The corrected co-occurrence statistics may be provided by the join path calculation using component 308 to the co-occurrence statistics calculation and/or storage component 304 for storage and/or retrieval in response to a subsequent join operation which may use the statistical co-occurrence scores for the same pairs of values.

FIG. 3 illustrates an exemplary division among offline components and online components. In some examples, offline components execute (e.g., continuously, continually, periodically, intermittently, etc.) independent of the online components (e.g., not in response to any event from the online components). The online components, for example, execute in response a request to join tables. The statistics indexing and serving component 306, in this example, has both an offline component (e.g., statistics indexing) and an online component (e.g., statistics serving).

Further, while FIG. 3 illustrates some components as offline components and some other components as online components, aspects of the disclosure may have any of the components operate in either an online mode or an offline mode. For example, the data crawling component 302 may operate in online mode in response to user's request for joining the tables and then the co-occurrence statistics calculation and/or storage component 304 may calculate the statistical co-occurrence scores in online mode which may be provided by the statistics indexing and serving component 306 in online mode. Similarly, the join path calculation using component 308 may operate in offline mode by calculating the join relationship for the pairs of values crawled by the data crawling component 302 (e.g., in offline mode). Thus, the join relationships are readily available whenever a request to join two tables is received. Input tables to join may also be received by the component 310 in offline mode (e.g., all requests may be received for processing in night when the load is likely to be less or the request to join may be anticipated based on earlier queries from the user and a likely next query based on the earlier queries).

Figure 4:
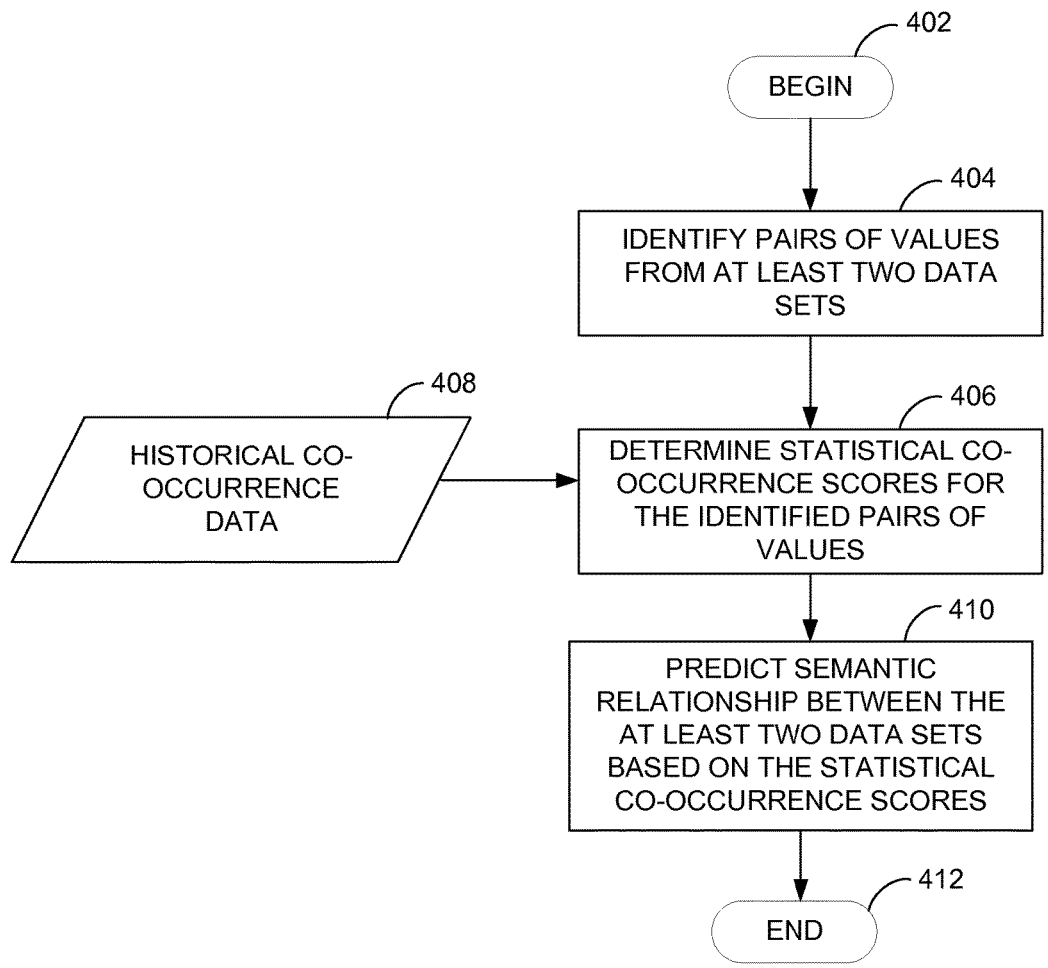
FIG. 4 is an exemplary flow chart illustrating operations of the computing device for predicting semantic relationship between data sets.

Referring next to FIG. 4, an exemplary flow chart illustrates operations of the computing device 102 for predicting semantic relationship between data sets. The process begins at 402 for predicting semantic relationship between data sets. At 404, pairs of values from at least two data sets are identified. The pairs of values include one value from a first one of the data sets and one value from a second one of the data sets. The identified pairs of values have different representations for the one value from the first one of the data sets and the one value from the second one of the data sets. For example, pair ("GB", "United Kingdom") represent a pair of value from Table 1(a) and Table 1(b). At 406, statistical co-occurrence scores for the identified pairs of values are determined based on historical co-occurrence data stored at 408. The statistical co-occurrence scores for the identified pairs of values are based on one or more of a row-level statistical co-occurrence score and a column-level statistical co-occurrence score. The statistical co-occurrence scores are determined by calculating an aggregate correlation score for the identified pairs of values based on a plurality of relational tables and maximizing the aggregate correlation score for the identified pairs of values for predicting the semantic relationship. The aggregate correlation score is a measure of semantic relation between the identified pairs of values in which the measure of semantic relation is derived from the plurality of relational tables (which may be sourced from public web pages, a big table corpus, and/or an enterprise database).

At 410, a semantic relationship between the at least two data sets is predicted, by a processor 104 associated with the computing device 102, using the determined statistical co-occurrence scores to enable a semantic join operation between the at least two data sets. The semantic join operation comprises performing an equi-join or a non-equi-join between the at least two data sets without using an intermediate mapping table. In some examples, the process ends at 412. In an example, the predicted semantic relationship is materialized as a bridge table (e.g., the bridge table is created from the predicted semantic relationship for the pairs of values. The bridge table is presented to the user 126 of the computing device 102 who may make corrections to the predicted semantic relationship in the bridge table. The bridge table is updated with the corrections to the predicted join relationship and the updated bridge table is stored as a portion of the historical co-occurrence data.

Figure 5:
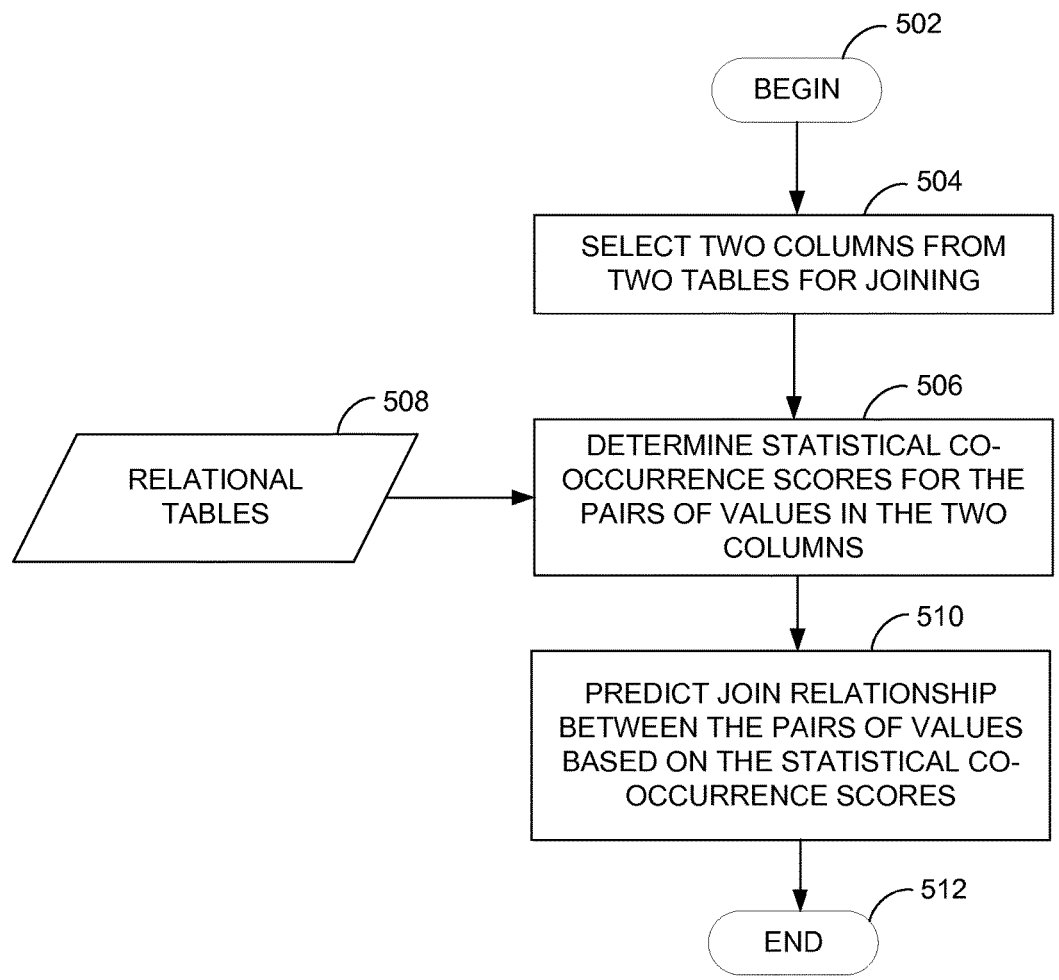
FIG. 5 is an exemplary flow chart illustrating operations of the computing device to predict join relationship for performing semantic join between tables.

Referring next to FIG. 5, an exemplary flow chart illustrates operations of the computing device 102 to predict join relationship for performing semantic join between tables. For simplicity, the process of FIG. 5 describes joining of two tables; however, the same process applies for joining more than two tables (e.g., performed iteratively). The process begins at 502 for performing semantic join between tables. At 504, two columns from two tables to be joined are selected for joining. The two columns may be selected by the user 126 of the computing device 102 or the processor 104 associated with the computing device 102 may be configured to select which two columns of the two tables to be joined (e.g., based on analysis of the columns of the two tables to be joined, such as the length of strings of the values in the columns of the two tables, numeric values etc.).

At 506, statistical co-occurrence scores for the pairs of values in the two columns are determined based on relational tables stored at 508. The relational tables may correspond to one or more of a big table corpus, an enterprise database, and historical co-occurrence data. At 510, join relationship between the pairs of values is predicted based on the statistical co-occurrence scores. In some examples, the process ends at 512.

Figure 6:
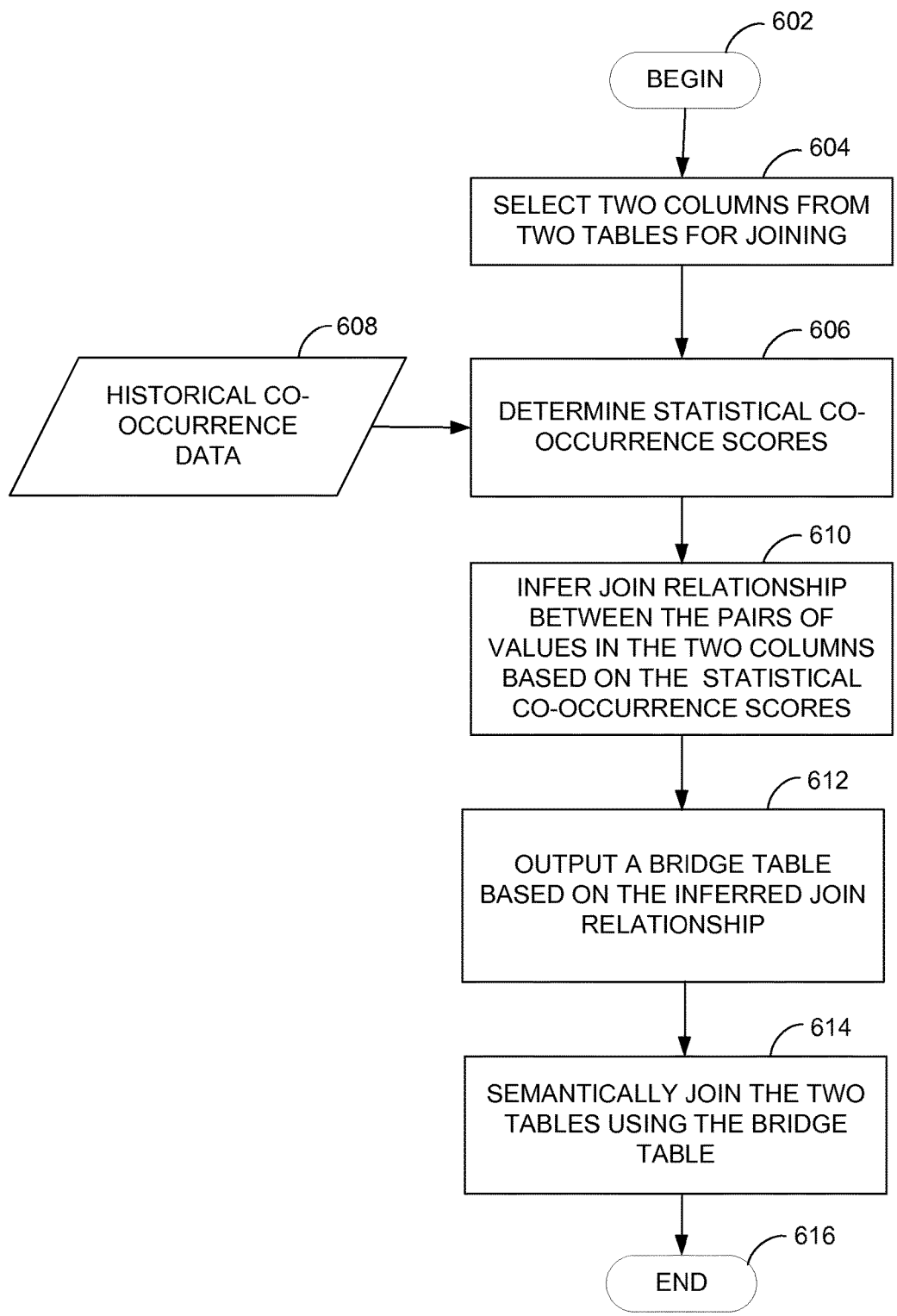
FIGS. 6, 7, and 8 are exemplary flow charts illustrating operations of the computing device to semantically join tables using an output bridge table.

Referring next to FIG. 6, an exemplary flow chart illustrates operations of the computing device 102 to semantically join tables using an output bridge table. For simplicity, the process of FIG. 6 describes joining of two tables; however, the same process applies for joining more than two tables (e.g., performed iteratively). The process begins at 602. At 604, two columns from two tables to be joined are selected for joining. At 606, statistical co-occurrence scores for the pairs of values in the two columns are determined based on historical co-occurrence data stored at 608. At 610, join relationship between the pairs of values in the two columns is inferred based on the statistical co-occurrence scores determined at 606. At 612, a bridge table is outputted based on the inferred join relationship. At 614, the two tables are semantically joined using the bridge table outputted at 612. The process ends at 616.

Figure 7:
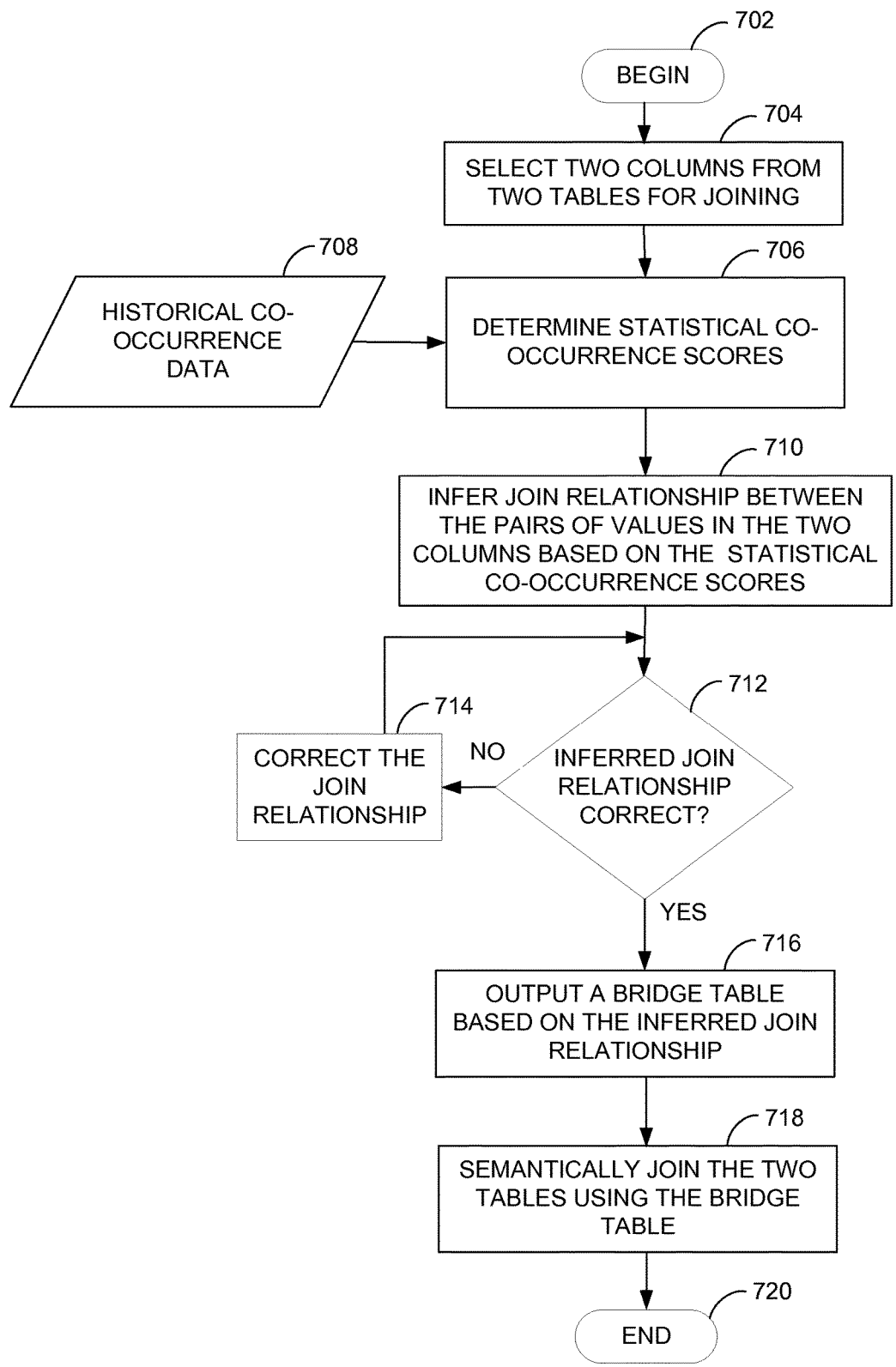

Referring next to FIG. 7, an exemplary flow chart illustrates operations of the computing device 102 to semantically join tables using an output bridge table. For simplicity, the process of FIG. 7 describes joining of two tables; however, the same process applies for joining more than two tables (e.g., performed iteratively). The process begins at 702. At 704, two columns from two tables to be joined are selected for joining. At 706, statistical co-occurrence scores for the pairs of values in the two columns are determined based on historical co-occurrence data stored at 708. At 710, join relationship between the pairs of values in the two columns is inferred based on the statistical co-occurrence scores determined at 706. At 712, it is determined if the inferred join relationship is correct, if yes, then at 716, a bridge table is outputted based on the inferred join relationship. If the inferred join relationship is determined to be not correct at 712, then at 714 the join relationship is corrected by the user 126 of the computing device 102 and the control is transferred to 712. The bridge table is outputted based on the corrected inferred join relationship at 716. At 718, the two tables are semantically joined using the bridge table outputted at 716. The process ends at 720.

Figure 8:
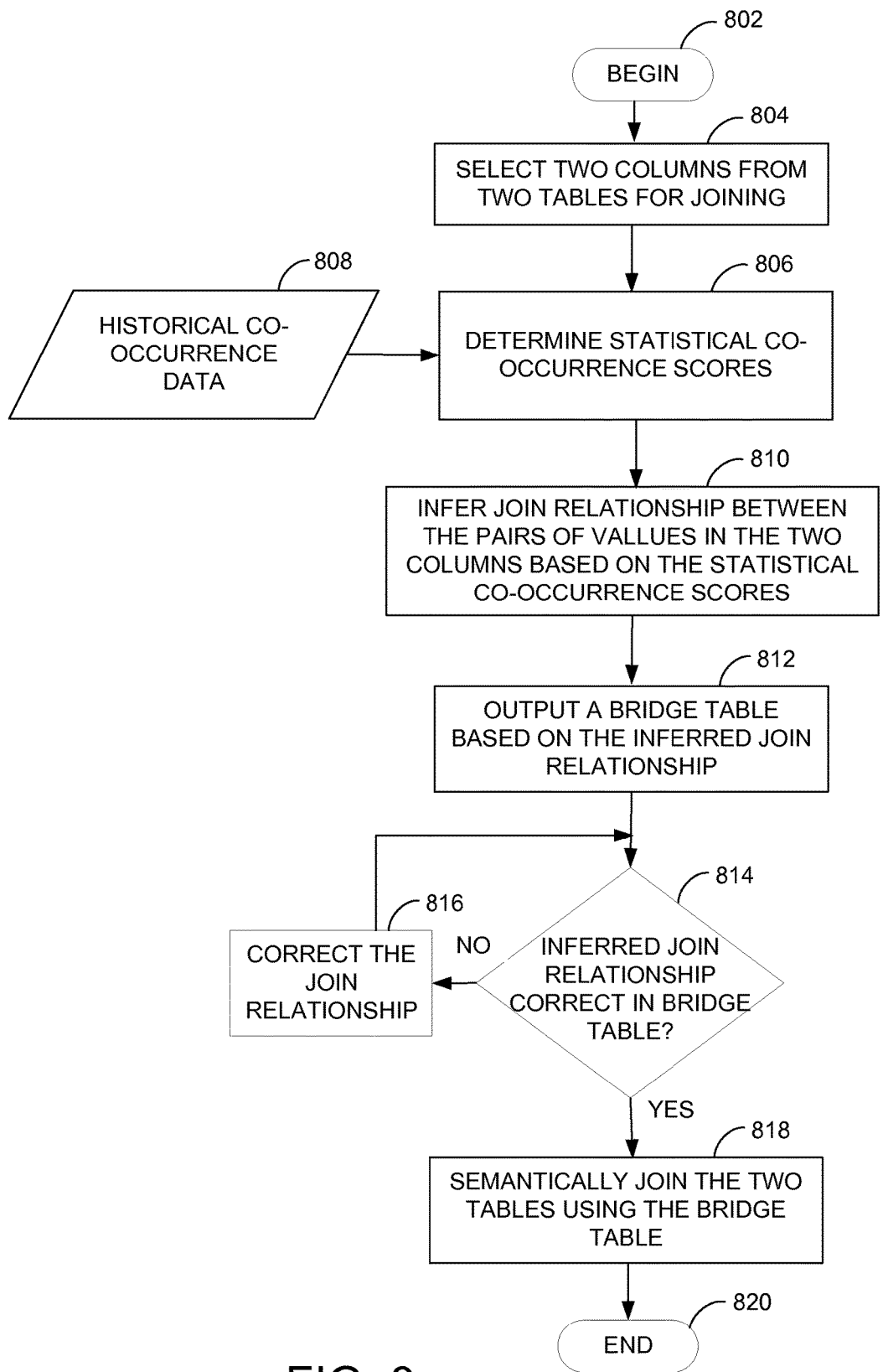

Referring next to FIG. 8, an exemplary flow chart illustrates operations of the computing device 102 to semantically join tables using an output bridge table. For simplicity, the process of FIG. 8 describes joining of two tables; however, the same process applies for joining more than two tables (e.g., performed iteratively). The process begins at 802. At 804, two columns from two tables to be joined are selected for joining. At 806, statistical co-occurrence scores for the pairs of values in the two columns are determined based on historical co-occurrence data stored at 808. At 810, join relationship between the pairs of values in the two columns is inferred based on the statistical co-occurrence scores determined at 806. At 812, a bridge table is outputted based on the inferred join relationship. In some examples, along with the bridge table, the user 126 may be presented with a set of corpus tables that best cover the bridge table. The user 126 may inspect the set of corpus tables to verify that the semantics and trustworthiness of the base tables in the big table corpus is adequate. At 814, if it is determined that the inferred join relationship in the bridge table is not correct then at 816 the join relationship in the bridge table is corrected by the user 126 of the computing device 102 and control is transferred to 814. If it is determined at 814 that the join relationship in the bridge table is correct then the two tables are semantically joined at 818 using the bridge table. The process ends at 820.

In some examples, the bridge table is outputted from a plurality of bridge tables (e.g., which may have been created earlier by the user 126 or by some other users) that are semantically coherent. In some examples, the inferred join relationships are ranked for semantic joins (this would help in resolving conflicting join relationships). For example, ("United Kingdom", "GB") is ranked higher than ("United Kingdom", "UK") based on semantic relationship and both the join relationships may be provided to the user 126 for conflict resolution.

Aspects of the disclosure also enable removing duplicates from the bridge table. For example, if there are two instances of "United States" and "United States of America" in two rows, then the bridge table is used to find country code "US" for both and thereby determines these two rows as representing duplicate values which should be removed. In some examples, the bridge table may be extended to multi-column keys. For example, airport codes may be joined with corresponding pairs for city, state, and country resulting in a bridge table having multiple columns. Exemplary schema for such bridge tables is {airport code||city, state, country}. In another example, if a first table having columns {Ticker, Mkt Cap} is to be joined with a second table having columns {Company, Market cap} the resulting bridge table is {Ticker, Mkt Cap||Company, Markey Cap}. The use of the additional market cap column in the bridge table adds additional information in the case of ambiguity. Thus, when generating statistics for multi-column keys, the numeric attributes may be blocked to buckets to allow the notion of approximate match in terms of numeric magnitude. For example, [MSFN|Mainstreet Financial|K] and [MSFT|Microsoft|100B] are the statistics to be counted (so there is now some context along with the statistics). This context may be checked, in some examples, to determine the statistical co-occurrence scores.

In some examples, if a cell value in a first table has no matching value in a second table, then the resulting bridge table may still include a predicted value from the second table. For example, if the first table has airport codes including "SEA" as a cell value and the second table has airport names including "SeaTac" (which does not have statistical co-occurrence), then the resulting bridge table may still include a row for {SEA||SeaTac}. This may be done by going through all candidate values in the second table in the candidate corpus tables (e.g., the ones in the top derivations or base tables used to generate the current bridge table) and using the values that yield the highest overall bridge table coherence score.

ADDITIONAL EXAMPLES

In some examples, aspects of the disclosure leverage a big table corpus (e.g., with over 100 million tables) to determine statistical correlation between cell values at both row-level and column-level. A correct join mapping is predicted as the one that maximizes aggregate pairwise correlation.

In an example scenario, Table 2(a) having hypothetical stock market capitalization data of different companies is to be joined with Table 2(b) having hypothetical political contribution by different companies.

TABLE 2(a)

Hypothetical Market Capitalization by Stock Ticker.

| STOCK TICKER | MARKET CAP | CHANGE % |
|---|---|---|
| MSFT | 380.15B | 5450% |
| ORCL | 170.54B | 118% |
| INTC | 157.73B | 3304% |
| GE | 255.88B | 469% |
| UPS | 94.27B | 49% |
| WMT | 341.25B | 1960% |
| LMT | 59.25B | 610% |
| BAC | 178.36B | 194% |
| IBM | 162.36B | 412% |

TABLE 2(b)

Hypothetical Political Contribution by Company.

| ORGANIZATION | CONTRIBUTION (1989-2013) |
|---|---|
| AT&T INC | $59,456,031 |
| GOLDMAN SACHS | $47,497,295 |
| UNITED PARCEL SERVICE | $34,216,308 |
| CITIGROUP INC | $33,910,357 |
| JPMORGAN CHASE & CO | $33,758,009 |
| BLUE CROSS/BLUE SHIELD | $31,978,236 |
| MICROSOFT CORP | $31,226,914 |
| GENERAL ELECTRIC | $30,392,306 |
| LOCKHEED MARTIN | $29,405,272 |

Note that the subject column of Table 2(a) is stock tickers, while the subject column of Table 2(b) is company names, making the two tables difficult to join using traditional systems.

In another example scenario, Table 3(a) lists hypothetical crime rate and hypothetical unemployment by city, and Table 3(b) lists hypothetical crime rate and hypothetical unemployment by state.

TABLE 3(a)

Hypothetical Crime Rate and Unemployment by City.

| CITY | CRIME RATE (PER 100,000 PERSONS) | UNEMPLOYMENT RATE % |
|---|---|---|
| New York | 2675 | 9.6 |
| Los Angeles | 3851 | 13.8 |
| Chicago | 5921 | 11.7 |
| Houston | 7060 | 8.5 |
| Philadelphia | 5569 | 10.8 |
| Phoenix | 7094 | 11.2 |
| Las Vegas | 5582 | 14.6 |
| San Diego | 4152 | 10.6 |
| San Antonio | 7082 | 7.3 |

TABLE 3(b)

Hypothetical Crime Rate and Unemployment by State.

| STATE | CRIME RATE (PER 100,000 PERSONS) | UNEMPLOYMENT RATE % |
|---|---|---|
| Ala. | 420.1 | 6.6 |
| Alaska | 606.5 | 6.8 |
| Ariz. | 405.9 | 6.9 |
| Ark. | 480.9 | 6.2 |
| Calif. | 411.1 | 7.3 |
| Colo. | 320.2 | 4.7 |
| Conn. | 272.8 | 6.4 |
| Del. | 559.5 | 6.5 |
| DC | 1202.1 | 7.7 |

If the user 126 tries to join Table 3(a) that has crime rate by city, with the state-level statistics in Table 3(b), so that one could compare the crime rate of a city to that of the corresponding state. If the Table 3(a) has an additional column with the state information of each city (using the state abbreviations in Table 3(b)), then an equi-join may be performed even using traditional systems. However, without such a column, the two Tables 3(a) and 3(b) cannot be joined easily using traditional systems. It may be noted that the relationship city→state is more semantic rather than syntactic, and the examples described herein are applicable to such relationships as well (in which the traditional approaches fail).

In exemplary Tables 1(a) and 1(b) and also in 2(a) and 2(b), the two joining columns (e.g., country code with country and stock ticker with organization name) conceptually refer to the same set of entities, and all pairs of joining values are almost synonymous. Other examples in this category include joining state names with state abbreviations, airport codes with cities, drug brand names with generic names, and chemical names with formulas, etc. Joins in this category are most likely one-to-one joins.

In another category, for example in Tables 3(a) and 3(b), the tables to be joined are related, but not synonymous, entities. Pairs of joining values in exemplary Tables 3(a) and 3(b) represent hierarchical relationship. Other examples in this category include joining drug names with pharmaceutical companies, car makes with models, congressmen with states they represent, and universities with their campus locations, etc. Joins in this category are often many-to-one joins.

Aspects of the disclosure provide an algorithm that takes two sets of values from join columns as input, and produces a predicted join relationship. Any two values that actually join in some semantic relationship (e.g., "MSFT" and "Microsoft Corp" in Table 2(a) and Table 2(b) respectively) have significant statistical co-occurrence in the same row in some tables of the corpus (e.g., more often than pure coincidence would put them together). This is referred to as row-level statistical co-occurrence score. Furthermore, for two pairs of values that join in the same relationship, e.g., ("MSFT", "Microsoft Corp") and ("ORCL", "Oracle"), not only are "MSFT" and "Microsoft Corp" occurring in the same row, and "ORCL", "Oracle" occurring in the same row, but also the pair ("MSFT", "Microsoft Corp") should co-occur with ("ORCL", "Oracle"), vertically in the same columns of some tables in the corpus. This type of correlation is referred to as column-level statistical co-occurrence score. These co-occurrences of "pairs-of-pairs" may be illustrated in a rectangular form shown in Table 4 below:

TABLE 4

Pairs of Joined Value-Pairs Co-occurring in a Table of Big Table Corpus.

| Microsoft Corp | ... | MSFT |
| . | | . |
| . | | . |
| . | | . |
| Oracle | ... | ORCL |

The correct join relationship is the one that maximizes aggregate pairwise correlation (e.g., maximize an aggregate correlation score, derived from the statistical co-occurrence scores, between all pairs of joined values), as described herein. Aspects of the disclosure provide a 2-approximation algorithm that uses linear program relaxation and rounding techniques to facilitate semantic non-equi joins, which is particularly useful in ad-hoc data analysis such as in spreadsheets environments.

Let R1 and S1 be the two tables to be joined. Let R∈R and S∈S be the two joining columns from the two tables respectively. While example are described as joining single columns R and S from the tables R and S aspects of the disclosure are applicable for multi-column joins as well. Let $R=\{r_i\}$ and $S=\{s_j\}$ be the two joining columns where $\{r_i\}$ and $\{s_j\}$ are sets of values in the columns. An optional many-to-one join relationship from R to S is a function J: $R \rightarrow S \cup \{\bot\}\}$, that joins each value in R with at most one value in S. Note that the optional many-to-one join J defines a mapping from each value $r_i \in R$ to either one value $s_j \in S$ or in case when no appropriate mapping exists, the special non-mapping symbol ⊥. The non-mapping case is to model practical scenarios where S may be incomplete, or R may sometimes be dirty with extraneous values mixed in. Optional many-to-one relationship bears some similarity to foreign keys. However, in a foreign key relationship each value on the many-side has to map to one and exactly one value on the one-side (the referential integrity), whereas non-mappings are allowed in the present disclosure.

Typical use scenarios in spreadsheet join starts when a user 126 has a "core" table with a set of entities (e.g., Table 1(a), Table 2(a), and Table 3(a)). Users then try to "extend" this core table by adding additional columns from other tables through many-to-one or one-to-one joins with another table (e.g., Table 1(b), Table 2(b), and Table 3(b), respectively). Naturally, when extending a table with additional columns in spreadsheets, the number of rows in the "core" table will not change, thus ensuring that the join must be many-to-one or one-to-one. Many-to-many joins, on the other hand, change the number of rows in the "core" table, which is not very natural in ad-hoc spreadsheet analysis, and quite uncommon. Though examples illustrate on-to-one and many-to-one joins, many-to-many joins is also within scope of the present disclosure.

Given two columns $R=\{r_i\}$ and $S=\{s_j\}$, there is an exponential number of optional many-to-one joins J between R and S. Examples of the disclosure measure the goodness, score, or other evaluation of a join J in order to select the one that is most appropriate. A join J from R to S (e.g., country to country code) is good if (1) at a row level, two values aligned by the join should be semantically related (e.g., "United States" and "US" are very related, "Germany" and "US" are unrelated); and (2) at a column level, each pair of joined values should also be semantically compatible. For example, the pair of values ("United Kingdom", "GB") is "compatible" with ("Germany", "DE"), because both are in the International Organization for Standardization (ISO)

standard and they co-occur in many tables. On the other hand, ("United Kingdom", "GB") is not semantically compatible with ("Germany", "GE"), because ("Germany", "GE") is in the other Federal Information Processing Standards (FIPS) code standard, where "United Kingdom" is actually abbreviated as "UK" instead of "GB". Thus, when values are joined up correctly, not only should value pairs in the same row be related, but also pairs of joined value pairs across columns should also be semantically compatible. The strength of semantic correlation helps in picking the join with the highest correlation score.

Aspects of the disclosure use a data-driven approach to quantify semantic correlation (e.g., rely on a big table corpus with matching characteristics of the input columns). Given a table corpus, if two values are semantically related and are thus candidates for joins (e.g., "United States" and "US"), people will naturally put them together in the same row more often than two random values. Furthermore, if two pairs of values are both semantically related in the same context/domain, (e.g., ("United Kingdom", "GB") and ("Germany", "DE")), then they are likely to co-occur in the same columns of some tables. Thus, some examples use statistical co-occurrence as a proxy for semantic correlation (e.g., point-wise mutual information (PMI) defined at both row-level and column-level is used in some examples). The PMI is commonly normalized to [−1, 1] using the normalized PMI (NPMI). For example, if $r_1$=United Kingdom, $s_1$=GB, Number of columns N=100M, $|T(r_1)|$=1000, $|T(s_1)|$=3000 and $|T(r_1, s_1)|$=500 (e.g., individually the two strings occur in 1000 and 3000 tables respectively; together they co-occur 500 times in the same row), then PMI $(r_1, s_1)$=4.22>0, and NPMI $(r_1, s_1)$=0.79, give a strong indication that the pairs of values are related.

Negative PMI score may be pruned away (indicating that their co-occurrence is less frequent than random chance) and only positive PMI scores may be kept, in some examples. This is equivalent to setting a PMI threshold of 0. Alternative definitions of correlation scores, such as the set-based Jaccard coefficient, may also be used as long as the strength of co-occurrence is captured (e.g., set-based Jaccard tends to produce a low score if s is highly popular but r is not, even if r always co-occurs with s).

After quantifying semantic correlation at the row and column level, the correct join is predicted as the one that maximizes the aggregate correlation score. Firstly, the aggregate row-wise scores are maximized. If the direction of the join is J: R→S (after testing both join directions and picking the join direction with a better score), then for each value $r_i$, join J determines the value J $(r_i)$ ∈S to be joined with $r_i$. The row-level correlation score for this pair may be written as $w(r_i, J(r_i))$, where w is a shorthand notation for the PMI score and $w(., \perp)$ is defined to be 0. Then the aggregate row-level correlation score is shown in exemplary Equation (1) below:

$$RS(J) = \Sigma_{r_i \in R} w(r_i, J(r_i)) \quad (1)$$

Similarly, column-level correlation score is calculated as shown in exemplary Equation (2) below:

$$CS(J) = \Sigma_{r_i \in R, r_j \in R, i \neq j} W(r_i, J(r_i), r_j, J(r_j)) \quad (2)$$

The join decision for each $r_i$ may be optimized individually, by picking the $s_j$ ∈S with the best score $w(r_i, s_j)$ that is positive, or picking ⊥ if none exists. While high precision is important to the joining, row-level score may sometime generate false positives which are more difficult for users to spot and correct compared to correcting false negatives. One reason for the false positives is that row-level scores only consider each pair $(r_i, J(r_i))$ individually, without taking into account the semantic compatibility across all matched pairs.

As an example, consider R={Germany, United Kingdom} and S={DE, GB, GE} and other ISO country codes. Suppose we have the following row-level scores: w(Germany, DE)=0.79, w(Germany, GE)=0.8, w(United Kingdom, GB)=0.85, while all other row level scores are low. Note that both (Germany, DE) and (Germany, GE) have high row-wise scores, because the former is in ISO standard while the latter is in the also-popular FIPS standard. The reason GE is also in ISO country code set S is because it represents country Georgia in ISO.

In row-level statistical co-occurrence score computation, the optimal solution is United Kingdom→GB (in ISO), and Germany→GE (in FIPS). Notice that Germany→GE (in FIPS) is picked over Germany→DE (in ISO), as it has slightly higher row-wise score. However, this result is apparently inconsistent because it gives no consideration to other values that are also being joined in the same table. In particular, since United Kingdom is joined with its ISO code GB (its FIPS code UK is not used by other countries in ISO so the alternative UK is not in S). The join selection Germany→GE in FIPS standard is then semantically incompatible with United Kingdom→GB.

In column-level statistical co-occurrence score computation, if the column-level scores are: w(Germany, DE, United Kingdom, GB)=0.6, w(Germany, GE, United Kingdom, GB)=0.05

Note that the score w(Germany, DE, United Kingdom, GB) is much higher, because (Germany, DE) and (United Kingdom, GB) are in the same ISO standard, thus co-occurring much more often in tables. The optimal solution for column-level is thus Germany→DE (in ISO) and United Kingdom→GB (in ISO). Note that the notion of semantic compatibility between pairs of matched values is captured by the use of column-level co-occurrence scores. The join decisions of each pair are made holistically (e.g., at the table level) in column-level statistical co-occurrence score, instead of individually (e.g., at row level) as in row-level statistical co-occurrence score.

In some examples, in which user queries are a pattern like "list of A and B", such "list" queries typically reflect users' intention of acquiring data from at least two related sets of data, which may typically be linked together by a join relationship. Some exemplary queries which acquire data from at least two related sets of data are listed below:

TABLE 5

Example Queries.

| | |
|---|---|
| list of us states and capitals | list of chemical elements and symbols |
| list of suvs and manufacturers | list of navy ships and homeports |
| list of airports and codes | list of nc counties and county seats |
| list of countries and continents | list heisman trophy winners and schools |
| ads campaign and campaign id | customer company and contact person |
| sales district and sales region | crm account id and company name |
| employee name and alias | employee name and job title |
| product and product division | customer industry and vertical |

Some examples use precision/recall metric to determine the quality of the predicted joins. As an example, precision is defined as shown in Equation (3) below:

$$p = \frac{\text{number of correctly joined pairs}}{\text{number of predicted pairs}}, \quad (3)$$

and recall is defined as shown in Equation (4) below:

$$r = \frac{\text{number of correctly joined pairs}}{\text{number of ground truth pairs}} \quad (4)$$

In some examples, F-measure is used as the aggregate quality measure which is the harmonic mean of precision and recall, defined as shown below in Equation (5):

$$f = \frac{2pr}{p+r} \quad (5)$$

While the default PMI threshold may be 0, column-level correlation is stable across different threshold values except when the threshold is high (e.g., like 0.8) in which both precision and recall decrease. This indicates that most of the useful value pairs have very high PMI scores (e.g., they are not pruned away even with high score thresholds). The fact that useful pairs have very high PMI scores is an indication that the signal from the underlying big table corpus is very strong and the aspects of the disclosure are robust against noises and perturbations.

In some examples, the user 126 inputs the two or more columns from the tables which are to be joined. In some other examples, the columns having semantic values may be inferred. Certain columns may be filtered out from which it is not easy to determine the co-occurrence scores (e.g., based on length of string of the values, numeric values etc. for which the co-occurrence scores may not be correctly determined or they may be irrelevant). For example for automatically joining Tables 1(a) and 1(b), "COUNTRY CODE" is inferred as relevant column (or entity) from Table 1(a) and "COUNTRY NAME" is inferred as relevant column (or entity) from Table 1(b) and the other columns are filtered out for determining co-occurrence score because the other columns include numeric values.

While aspects of the disclosure describe that the statistical co-occurrence scores are determined based on historical co-occurrence data, in some examples, aspects of the disclosure index data in real-time (e.g., considering the co-occurrence data for the pair of values at a present time). In some examples, the statistical co-occurrence scores may be determined based on the future of the big table corpus. For example, the future of the big table corpus may be predicted and the statistical co-occurrence scores may be determined based on the predicted big table corpus.

Alternatively or in addition to the other examples described herein, examples include any combination of the following:

- the processor is programmed to identify the pairs of values by identifying a plurality of combinations of values from the first one of the tables and values from the second one of the tables.
- the processor is programmed to infer the join relationship by generating a maximum aggregate correlation score among all pairs of values, wherein the join relationship is automatically inferred if the maximum aggregate correlation score is above a threshold.
- the statistical co-occurrence scores for the identified pairs of values are based on one or more of a row-level statistical co-occurrence score and a column-level statistical co-occurrence score.
- the processor is further programmed to: output a bridge table based on the inferred join relationship; and perform semantic join of the at least two of the tables using the bridge table.
- the statistical co-occurrence scores for the identified pairs of values is determined by: crawling a plurality of relational tables; measuring an aggregate correlation score for the identified pairs of values based on the crawled plurality of relational tables; generating a portion of the historical co-occurrence data using the measured aggregate correlation score; and calculating the statistical co-occurrence scores for the identified pairs of values based on the generated portion of the historical co-occurrence data.
- the aggregate correlation score is a measure of semantic relation between the identified pairs of values, the measure of semantic relation being derived from the plurality of relational tables.
- the processor is further programmed to: crawl a plurality of relational tables, in an offline mode, to generate the statistical co-occurrence scores for pairs of values in the plurality of tables; and store the generated statistical co-occurrence scores in the memory area.
- the identified pairs of values have different representations for the one value from the first one of the data sets and the one value from the second one of the data sets.
- materializing the predicted semantic relationship as a bridge table; enabling corrections, by a user of the computing device, to the predicted semantic relationship in the bridge table; and updating the bridge table with the corrections to the predicted join relationship.
- storing the updated bridge table as a portion of the historical co-occurrence data.
- the statistical co-occurrence scores are determined by: calculating an aggregate correlation score for the identified pairs of values based on a plurality of relational tables; and maximizing the aggregate correlation score for the identified pairs of values for predicting the semantic relationship.
- the aggregate correlation score is a measure of semantic relation between the identified pairs of values, the measure of semantic relation being derived from the plurality of relational tables.
- the plurality of relational tables are sourced from at least one of public web pages or an enterprise database.
- the semantic join operation comprises performing an equi-join between the at least two data sets without using an intermediate mapping table.
- an identification component that on execution by at least one processor causes the at least one processor to identify pairs of values from at least two data sets, the pairs of values including one value from a first one of the data sets and one value from a second one of the data sets.
- a statistics serving component that on execution by at least one processor causes the at least one processor to calculate statistical co-occurrence scores for one or more of the identified pairs of values based on their strength of correlation in a big table corpus.
- a join path calculation component that on execution by at least one processor causes the at least one processor to compute a join relationship between the one or more of the identified pairs of values using the statistical co-occurrence scores.
- a user interface component that on execution by at least one processor causes the at least one processor to present the computed join relationship to a user for performing semantic join of the at least two data sets.

a crawling component that on execution by at least one processor causes the at least one processor to crawl the big table corpus for determining the strength of correlation for one or more of the identified pairs of values.

At least a portion of the functionality of the various elements in FIGS. 3-8 may be performed by other elements in FIG. 1, or an entity (e.g., processor, web service, server, application program, computing device, etc.) not shown in FIG. 1.

In some examples, the operations illustrated in FIGS. 3-8 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device 102 when configured to execute the instructions described herein.

The examples illustrated and described herein as well as examples not specifically described herein but within the scope of aspects of the disclosure constitute exemplary means for automatic semantic join on the data in at least two tables that use different representations. The data corresponds to pairs of values using different representation (e.g., the pairs of values may be for the same concept in different representations, such as ("GB", "United Kingdom") refers to the same concept of country but in different representation, or the pairs of values may be for related concepts in different representation, such as ("Los Angeles", "Calif.") refers to related concept of city and state which are in different representations). For example, the elements illustrated in FIG. 1, such as when encoded to perform the operations illustrated in FIGS. 4-8, constitute exemplary means for identifying pairs of values from at least two data sets, exemplary means for determining the statistical co-occurrence scores for identified pairs of values based on the historical co-occurrence data, and exemplary means for predicting the semantic relationship between the at least two data sets using the determined statistical co-occurrence scores to enable a semantic join operation between the at least two data sets.

Alternatively, or in addition, the functions described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip (SOC) implementations, complex programmable logic devices (CPLDs), etc.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system for performing semantic join operations on data in different representations, said system comprising:
  a memory area associated with a computing device, said memory area storing a plurality of tables having columns of values; and
  a processor programmed to:
    receive a request to perform a semantic join operation on at least two of the tables stored in the memory area;
    in response to the received request, identify pairs of values from the at least two tables, the pairs of values including one value from a column in a first one of the tables and one value from a column in a second one of the tables;
    determine, based on historical co-occurrence data, statistical co-occurrence scores for the identified pairs of values, wherein the statistical co-occurrence scores for the identified pairs of values are based on a row-level statistical co-occurrence score and a column-level statistical co-occurrence score;
    infer a join relationship between the at least two tables using the statistical co-occurrence scores by generating a maximum aggregate correlation using the statistical co-occurrence scores; and
    perform a semantic loin operation between the at least two tables using the statistical co-occurrence scores.

2. The system of claim 1, wherein the processor is programmed to identify the pairs of values by identifying a plurality of combinations of values from the first one of the tables and values from the second one of the tables.

3. The system of claim 1, wherein the processor is programmed to infer the join relationship by generating the maximum aggregate correlation score among all pairs of values, wherein the join relationship is automatically inferred if the maximum aggregate correlation score is above a threshold, and inferred join relationships are ranked for semantic joins.

4. The system of claim 1, wherein the historical co-occurrence data comprises at least one or more of a big table corpus, data from an enterprise database, and earlier co-occurrence data.

5. The system of claim 1, wherein the processor is further programmed to:
  output a bridge table based on the inferred join relationship; and
  perform a semantic join of the at least two of the tables using the bridge table.

6. The system of claim 1, wherein the statistical co-occurrence scores for the identified pairs of values is determined by:
  crawling a plurality of relational tables;
  measuring an aggregate correlation score for the identified pairs of values based on the crawled plurality of relational tables;
  generating a portion of the historical co-occurrence data using the measured aggregate correlation score; and
  calculating the statistical co-occurrence scores for the identified pairs of values based on the generated portion of the historical co-occurrence data.

7. The system of claim 6, wherein the aggregate correlation score is a measure of semantic relation between the identified pairs of values, the measure of semantic relation being derived from the plurality of relational tables.

8. The system of claim 1, wherein the processor is further programmed to:
  crawl a plurality of relational tables, in an offline mode, to generate the statistical co-occurrence scores for pairs of values in the plurality of tables; and
  store the generated statistical co-occurrence scores in the memory area.

9. A method comprising:
  identifying pairs of values from at least two data sets, the pairs of values including one value from a first one of the data sets and one value from a second one of the data sets;
  determining, based on historical co-occurrence data, statistical co-occurrence scores for the identified pairs of values, wherein the statistical co-occurrence scores for the identified pairs of values are based on a row-level statistical co-occurrence score and a column-level statistical co-occurrence score;
  predicting, by a processor associated with a computing device, a semantic relationship between the at least two data sets using the determined statistical co-occurrence scores by generating a maximum aggregate correlation using the statistical co-occurrence scores to enable a semantic join operation between the at least two data sets; and performing a semantic loin operation between the at least two data sets using the determined statistical co-occurrence scores.

10. The method of claim 9, wherein the identified pairs of values have different representations for the one value from the first one of the data sets and the one value from the second one of the data sets.

11. The method of claim 9, wherein the statistical co-occurrence scores for the identified pairs of values are based on one or more of a row-level statistical co-occurrence score and a column-level statistical co-occurrence score.

12. The method of claim 9, further comprising:
materializing the predicted semantic relationship as a bridge table;
enabling corrections, by a user of the computing device, to the predicted semantic relationship in the bridge table; and
updating the bridge table with the corrections to the predicted join relationship.

13. The method of claim 12, further comprising storing the updated bridge table as a portion of the historical co-occurrence data.

14. The method of claim 9, wherein the statistical co-occurrence scores are determined by:
calculating an aggregate correlation score for the identified pairs of values based on a plurality of relational tables; and
maximizing the aggregate correlation score for the identified pairs of values for predicting the semantic relationship.

15. The method of claim 14, wherein the aggregate correlation score is a measure of semantic relation between the identified pairs of values, the measure of semantic relation being derived from the plurality of relational tables.

16. The method of claim 14, wherein the plurality of relational tables are sourced from at least one of public web pages or an enterprise database.

17. The method of claim 9, wherein the semantic join operation comprises performing an equi-join between the at least two data sets without using an intermediate mapping table.

18. One or more computer storage media embodying computer-executable components, said components comprising:
an identification component that on execution by at least one processor causes the at least one processor to identify pairs of values from at least two data sets, the pairs of values including one value from a first one of the data sets and one value from a second one of the data sets;
a statistics serving component that on execution by at least one processor causes the at least one processor to calculate statistical co-occurrence scores for one or more of the identified pairs of values based on their strength of correlation in a big table corpus, wherein the statistical co-occurrence scores for the identified pairs of values are based on a row-level statistical co-occurrence score and a column-level statistical co-occurrence score;
a join path calculation component that on execution by at least one processor causes the at least one processor to compute a join relationship between the one or more of the identified pairs of values using the statistical co-occurrence scores by generating a maximum aggregate correlation using the statistical co-occurrence scores; and
a user interface component that on execution by at least one processor causes the at least one processor to present the computed join relationship to a user for performing semantic join of the at least two data sets,
wherein the join path calculation component that on execution by the at least one processor causes the at least one processor to perform a semantic join operation between the at least two data sets using the statistical co-occurrence scores.

19. The computer storage media of claim 18, further comprising a crawling component that on execution by at least one processor causes the at least one processor to crawl the big table corpus for determining the strength of correlation for one or more of the identified pairs of values.

20. The computer storage media of claim 18, wherein the statistical co-occurrence scores for the one or more of the identified pairs of values are based on one or more of a row-level statistical co-occurrence score and a column-level statistical co-occurrence score.

* * * * *